(12) United States Patent
Roh et al.

(10) Patent No.: US 9,338,645 B2
(45) Date of Patent: May 10, 2016

(54) METHOD AND SYSTEM FOR MESSAGE SERVICE IN MULTI-DEVICE ENVIRONMENT AND APPARATUS THEREFOR

(71) Applicant: SK PLANET CO., LTD., Seongnam-si, Gyeonggi-do (KR)

(72) Inventors: Hai Gang Roh, Seongnam-si (KR); Han Joon Kim, Seoul (KR)

(73) Assignee: SK PLANET CO., LTD., Seongnam-Si, Gyeonggi-Do (KR)

( * ) Notice: Subject to any disclaimer, the term of this patent is extended or adjusted under 35 U.S.C. 154(b) by 0 days.

(21) Appl. No.: 14/344,184

(22) PCT Filed: Oct. 12, 2012

(86) PCT No.: PCT/KR2012/008291
§ 371 (c)(1),
(2) Date: Mar. 11, 2014

(87) PCT Pub. No.: WO2013/183818
PCT Pub. Date: Dec. 12, 2013

(65) Prior Publication Data
US 2015/0044998 A1    Feb. 12, 2015

(30) Foreign Application Priority Data

Jun. 8, 2012 (KR) .......................... 10-2012-0061573
Jun. 15, 2012 (KR) .......................... 10-2012-0064507

(51) Int. Cl.
*H04W 4/00* (2009.01)
*H04W 12/02* (2009.01)
(Continued)

(52) U.S. Cl.
CPC ............. *H04W 12/02* (2013.01); *G06Q 10/107* (2013.01); *H04L 63/0428* (2013.01); *H04W 4/12* (2013.01); *H04W 12/06* (2013.01)

(58) Field of Classification Search
CPC .... H04W 12/02; H04W 4/12; H04L 63/0428; G06Q 10/107
USPC ........ 455/456.1, 457, 466, 461, 412.1, 412.2, 455/414.1, 414.2; 709/204, 206, 207, 227; 379/211.02, 211.04
See application file for complete search history.

(56) References Cited

U.S. PATENT DOCUMENTS 8,965,421 B1 * 2/2015 Sanjeev ...................... 455/466
2003/0046296 A1  3/2003 Doss et al.
(Continued)

FOREIGN PATENT DOCUMENTS

KR    1020040085089 A    10/2004
KR    1020060065827 A     6/2006
(Continued)

OTHER PUBLICATIONS

International Search Report mailed Mar. 13, 2013 for PCT/KR2012/008291.
(Continued)

*Primary Examiner* — Wayne Cai
(74) *Attorney, Agent, or Firm* — Hauptman Ham, LLP

(57) ABSTRACT

The present invention relates to a method and a system for a message service in a multi-device environment in which one or more terminals are used by a user, and to an apparatus therefor, the present invention registering, for each user, one or more terminals which will be using a message service and providing the message service by means of the one or more registered terminals, thereby providing additional services comprising user privacy protection and/or provision of presence information.

11 Claims, 7 Drawing Sheets

(51) Int. Cl.
*G06Q 10/10* (2012.01)
*H04L 29/06* (2006.01)
*H04W 4/12* (2009.01)
*H04W 12/06* (2009.01)

(56) References Cited

U.S. PATENT DOCUMENTS

2003/0104819 A1  6/2003  Knauerhase et al.
2007/0174405 A1  7/2007  Chen et al.
2008/0313297 A1  12/2008  Heron et al.
2010/0275032 A1* 10/2010  Bhangi ................ 713/182
2011/0142210 A1*  6/2011  Detering et al. ........ 379/88.13
2012/0192287 A1*  7/2012  Cai et al. ................ 726/28

FOREIGN PATENT DOCUMENTS

KR       100661743 B1   12/2006
KR     1020110057516 A    6/2011
KR     1020110121406 A   11/2011

OTHER PUBLICATIONS

The extended European Search Report received in connection with the counterpart European Patent Application No. 12878299.2 mailed on May 29, 2015.

* cited by examiner

FIG. 8

| | | | |
|---|---|---|---|
| A | ○cheolsu | Out | —801 |
| B | ○yeonghui | On duty | —802 |
| C | ○gildong | On duty | —803 |
| D | ○yeongsu | Off duty | —804 |
| E | ○sumi | Logged out | —805 |

FIG. 9

| | | | |
|---|---|---|---|
| A | ○cheolsu | Out | —901 |
| B | ○yeonghui | On duty | —902 |
| C | ○gildong | Out | —903 |
| D | ○yeongsu | Out | —904 |
| E | ○sumi | Logged out | —905 |

METHOD AND SYSTEM FOR MESSAGE SERVICE IN MULTI-DEVICE ENVIRONMENT AND APPARATUS THEREFOR

TECHNICAL FIELD

The present invention relates to a method and system for a message service in a multi-device environment for providing various services to a user based on the multi-device environment in which the user uses at least one terminal, and a device therefor.

BACKGROUND ART

Recently, due to the remarkable development of information communication technology and semiconductor technology, the spread and use of mobile terminals are rapidly increasing. In particular, recent mobile terminals have branched out from their traditional areas, ushering in a mobile convergence era in which areas of other terminals are included through performance improvement.

Representatively, in addition to a general communication function such as voice calling or transmission and reception of messages, various functions such as a TV viewing function (for example, mobile broadcasting such as digital multimedia broadcasting (DMB) or digital video broadcasting (DVB)), a music reproducing function (for example, MPEG audio layer-3 (MP3)), a photographing function, and an Internet access function have been added to a mobile communication terminal.

Furthermore, as recent mobile communication terminals develop into the form of smartphones in which a user can arbitrarily install various user functions based on an open OS, convenience and varieties of entertainment have been provided. Such smartphones support customers in easily obtaining applications having various desired functions with activation of open markets. In addition, high-performance smart phones can process many functions processed in a PC.

Such convergence trends are spreading to other electronic devices in addition to mobile communication terminals. For example, open OSs are being installed in TVs, which have so far been operated as simple image receiving devices, causing convergence of communication functions enabling various services to be used as in a smartphone or a PC.

In this way, as various electronic and communication devices have similar functions, there is growing interest in a multi-device environment in which a service can be used through two or more different terminals at the same time.

In such a multi-device environment, the user can use the same service and function through various terminals such as a TV, a desktop computer, a laptop, a tablet PC, and a smartphone at the same time without being limited to a specific terminal.

In particular, in a message service that allows a text-based message to be exchanged between users, a service has been provided based on the multi-device environment in which a message related to the user is simultaneously provided to a plurality of terminals registered by the user, and thus the user may check a received message or transmit a message to another user through any terminal.

However, in such a multi-device environment in which a single user uses the plurality of terminals, there are problems and inconveniences that are difficult to predict based on an existing environment having a one-to-one correspondence between the user and the terminal.

For example, a privacy disclosure problem or a user presence information processing problem may occur when the message is simultaneously transmitted to a plurality of user terminals.

DISCLOSURE

Technical Problem

The present invention provides a method and system for a message service in a multi-device environment for providing various services to a user based on the multi-device environment in which the user uses at least one terminal, and a device therefor.

In particular, the present invention provides a method and system for a message service in a multi-device environment in which the user uses the message service through at least one terminal and user privacy can be prevented from being disclosed through a specific terminal that is lost or not managed out of one or more terminals, and a device therefor.

In addition, the present invention provides a method and system for a message service in a multi-device environment in which, when the message service is provided in the multi-device environment, state information is determined based on location information and personal schedule information of the user who executes the message service and presence information corresponding to the state information can be provided, and a device therefor.

Furthermore, the present invention provides a method and system for a message service in a multi-device environment in which an appropriate sub-game operation may be provided to each user using a separate personal terminal when a plurality of users operate a game through a specific terminal, and a device therefor.

Technical Solution

According to an aspect of the invention, there is provided a message service system in a multi-device environment. The system includes a service device that registers at least one terminal as a device for using a message service for each user, provides transmission and reception messages of the user to the at least one registered terminal at the same time, and provides an additional service including at least one of user privacy protection and presence information providing based on the at least one registered terminal, and the at least one terminal that uses the message service and the additional service through the service device.

According to a service restriction request of a specific terminal out of the at least one terminal, the service device may perform control such that message transmission to the specific terminal is blocked or a message is disclosed to only a user who is authenticated in the specific terminal.

The service device may collect location information and personal schedule information of at least one user from the at least one terminal, analyze at least one piece of the collected location information and personal schedule information, determine state information of the user, and provide the determined state information as presence information of the user.

According to another aspect of the invention, there is provided a service device for a message service in a multi-device environment. The device includes a communication unit configured to transmit and receive data with a plurality of terminals via a communication network, a storage unit configured to store registration information of at least one terminal that is used by a user, and a service control unit that registers at least one terminal that uses a message service for each user, provides the message service through the at least one registered terminal, and provides an additional service including at least one of user privacy protection and presence information providing based on the at least one registered terminal.

According to a service restriction request of a specific terminal out of the at least one terminal, the service control unit may perform control such that message transmission to the specific terminal is blocked or a message is disclosed to only a user who is authenticated in the specific terminal.

When the service restriction request of the specific terminal is released after message transmission to the specific terminal is blocked, the service control unit may transmit a message that is not delivered up to a release time to the specific terminal.

The service control unit may receive the service restriction request of the specific terminal from any terminal out of the plurality of terminals, extract a terminal that does not use the message service for a predetermined time or more as the specific terminal out of the plurality of terminals, and generate a service restriction request.

The service control unit may encrypt a message and transmit the message such that the message is disclosed to only an authenticated user and perform control such that the message is decoded and displayed after the user is authenticated in the specific terminal. When the message is transmitted to the specific terminal, the service control unit may also transmit a hiding or display restriction request of the message and display the message after the user is authenticated.

The service control unit may perform control such that location information and personal schedule information of at least one user are collected from the at least one terminal, at least one piece of the collected location information and personal schedule information are comparatively analyzed, state information of the user is determined, and the determined state information is provided as presence information of the user.

The service control unit may determine a priority of the collected information based on a property including at least one of a time zone in which the location information or the personal schedule information is collected and a type of the terminal, and determine the state information of the user based on information having a high priority.

According to still another embodiment of the invention, there is provided a terminal for a message service in a multi-device environment. The terminal includes a communication unit configured to transmit and receive data via a communication network, an input unit configured to generate a user input signal corresponding to a user's request, a control unit configured to perform control such that communication is performed with a service device through the communication unit and a message related to the user is transmitted, received, and output, and when a service restriction request of the user is generated through the input unit, a service restriction request of a specific terminal out of a plurality of terminals that are used by the user is transmitted to the service device, and an output unit configured to output transmitted and received messages under control of the control unit.

The control unit may perform control such that a transmission and reception state of the message is hidden so as not to be known under control of the service device and the hidden message is displayed through the output unit when the user is successfully authenticated. The control unit may display at least one of a sender, a receiver, and some of the message content of the transmitted and received messages in an unrecognizable state, and convert at least one of the sender, the receiver, and the some of the message content into a recognizable state when the user is successfully authenticated. The control unit may perform control such that, when an encrypted message is received from the service device, a reception state of the message is notified, and the message is decoded and output when the user is successfully authenticated.

According to yet another embodiment of the invention, there is provided a message service method performed by a service device in a multi-device environment. The method includes providing transmission and reception messages of a user to a plurality of terminals registered by the user at the same time, checking a service restriction request of a specific terminal out of the plurality of terminals while the transmission and reception messages of the user are provided to the plurality of terminals, and controlling the specific terminal such that message transmission to the specific terminal for which service restriction is requested is blocked or a message is disclosed to only a user who is authenticated in the specific terminal.

In the controlling, the service device may encrypt a message and transmit the message to the specific terminal, and thus the message may be decoded after the user is authenticated in the specific terminal. In the controlling, the service device may transmit the message to the specific terminal along with a hiding or display restriction request of the message and the message may be disclosed only after the specific terminal authenticates the user.

According to still another embodiment of the invention, there is provided a message service method performed by a service device in a multi-device environment. The method includes registering information of at least one terminal that uses a message service, collecting location information and personal information of at least one user from the at least one terminal, comparatively analyzing at least one piece of the collected location information and personal schedule information and determining state information of the user, and providing the determined state information as presence information of the user.

The collecting may include receiving the personal schedule information stored in the at least one terminal that executes the message service from each terminal.

The location information may include at least one piece of information among GPS information and an access IP of a terminal in which the message service is executed.

In the determining, the personal schedule information of the user classified by at least one of day of the week, date, and hour may be compared with the location information, and when there is personal schedule information matching the location information and the hour, the state information may be determined based on the matching personal schedule information.

Advantageous Effects

As described above, according to the embodiment of the invention, the user, who uses the message service including a short message service, a multimedia message service, an instant message service, or the like, registers a plurality of terminals including, for example, at least one of a desktop PC, a laptop computer, a tablet PC, and a mobile communication terminal as a multi-device, and is allowed to use the message service at the same time. When a specific terminal of the plurality of terminals is lost or is left in an environment in which another user can use the terminal, disclosure of a message through the specific terminal is restricted. Accordingly, it is possible to prevent user privacy information from being disclosed through the specific terminal.

In addition, according to another embodiment of the invention, the terminal determines presence information according to the state information in which the location information and the personal schedule information of the user who executes the message service are combined and transmits the determined information to another terminal. Therefore, it is possible to check a current state of a partner in real time and to conveniently use the message service.

DESCRIPTION OF DRAWINGS

FIGS. 8 and 9 are diagrams illustrating exemplary service screens according to the second embodiment of the invention.

MODES OF THE INVENTION

Hereinafter, exemplary embodiments of the invention will be described in detail with reference to the accompanying drawings. However, detailed descriptions of well-known functions or configurations that unnecessarily obscure the gist of the invention in the following explanations and accompanying drawings will be omitted. The same reference numbers will be used throughout this specification to refer to the same or like parts.

Figure 1:
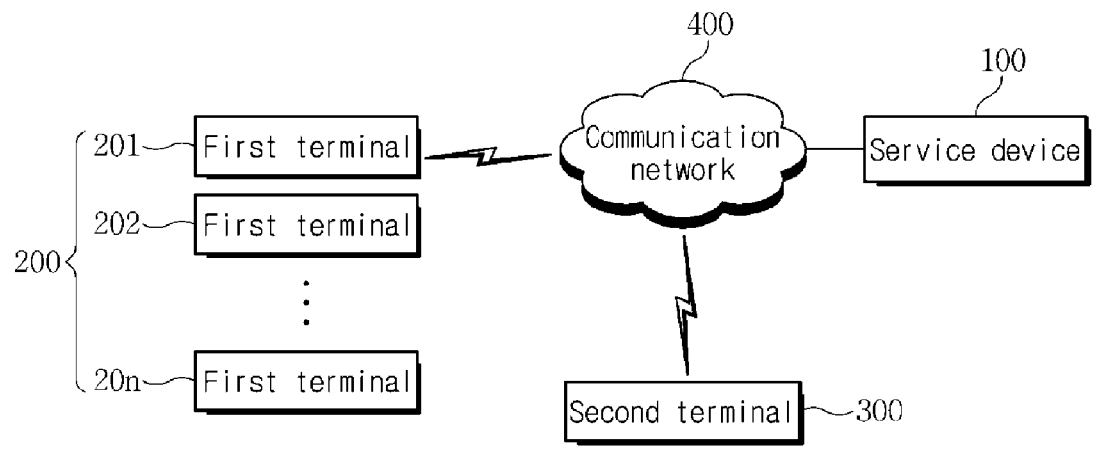
FIG. 1 is a schematic diagram illustrating a configuration of a service system in a multi-device environment according to an embodiment of the invention.

FIG. 1 is a schematic diagram illustrating a configuration of a message service system in a multi-device environment according to an embodiment of the invention.

As illustrated in FIG. 1, the message service system according to the embodiment of the invention may include a service device 100, a plurality of first terminals 200 and a second terminal 300 via a communication network 400.

The service device 100 provides various services to a user based on a multi-device environment according to the invention.

According to first and second embodiments of the invention, the service device 100 may provide a text-based message service to a plurality of arbitrary users via the communication network 400. Here, the message service may include, for example, a short message service (SMS), a long message service (LMS), a multimedia message service (MMS), an instant message service, and a mobile message service.

For any user, the service device 100 registers and stores information (including identification information and access information) on a plurality of first terminals 200 that can be used by the user and provides a multi-device based service which simultaneously provides transmission and reception messages related to the user to the plurality of registered first terminals 200.

In addition, while the transmission and reception messages of the user are simultaneously provided to the plurality of first terminals 200 registered by the user, according to a service restriction request of a specific first terminal 201 out of the plurality of first terminals 200, the service device 100 performs control such that the message is not disclosed through the specific first terminal 201. That is, it is controlled such that no user other than the user sees the message related to the user through the specific first terminal 201. Here, control on the specific first terminal 201 may be performed through various methods. This will be described in detail with reference to FIG. 2.

The service device 100 may be implemented by various computing methods such as a server-client based computing method and a cloud computing method.

The plurality of first terminals 200 are used by the user, are registered in the service device 100, simultaneously receive the message related to the user from the service device 100, and display the message according to a first embodiment of the invention. The plurality of first terminals 200 may include any electronic and communication device having a communication function capable of processing a message service, and in particular, may include various terminals of the same kind or different kinds. For example, the plurality of first terminals 200 may include a desktop PC, a laptop, a tablet PC, a mobile communication terminal including a smartphone, a personal digital assistant (PDA), and a TV having a communication function. In addition, the plurality of first terminals 200 may request service restriction of the specific first terminal 201 from the service device 100 according to a user's request, or may perform a hiding or display restriction process in order not to disclose the message related to the user under control of the service device 100. A main configuration and operations of the first terminal 200 will be described in detail with reference to FIG. 3.

The second terminal 300 illustrated in FIG. 1 refers to a terminal used by a partner user who exchanges a message with the user who uses the plurality of first terminals 200. Here, although the partner may register and use a plurality of terminals, a configuration and operations thereof may be the same as those of the plurality of terminals 200 of the user. Therefore, a detailed description thereof will be omitted.

The communication network 400 used in the system according to the embodiment of the invention connects the plurality of first terminals 200 and the service device 100 and delivers data, and may be configured in a form that can integrate and provide at least one method among a wired communication method such as the Internet, a wireless communication method including Wi-Fi, and various generations of mobile communication methods such as 2G, 3G, and 4G.

Meanwhile, the second embodiment of the invention may provide a location-based message service through a service providing system 10.

In this case, the service device 100 transmits and receives data related to a message service with the first and second terminals 200 and 300 via the communication network 400. In particular, when at least one first terminal 201 of the plurality of first terminals 200 executes the message service, the service device 100 collects location information on an area in which the first terminal 201 that executes the message service is located and personal schedule information of the user. Here, the personal schedule information defines the user's schedule by day of the week, date, and hour, and may be input by the user and be stored. The service device 100 checks the location information and the personal schedule information and determines state information based on the checked location information and personal schedule information. Then, the service device 100 provides presence information corresponding to the state information of the first terminal 201 to the second terminal 300.

The service device 100 determines a priority of collected information based on a property including at least one of a time zone during which the location information or the personal schedule information is collected and a type of the terminal, and may determine current state information of the user based on information having a high priority.

The service device 100 according to the embodiment of the invention checks the location information of the first terminal 200 and login or logout information of the message service using the first terminal 200, or the like, analyzes the personal schedule information on the schedule of the user by hour, date, day of the week, week, and month, and determines the state information. Specifically, the service device 100 checks personal schedule information that matches a current location and time zone. When there is matching personal schedule information, the state information may be determined based on the matching personal schedule information. In this case, when a plurality of terminals having different location information access the message service at the same time, the service device 100 determines the state information by combining current location information of the first terminal 200 and corresponding personal schedule information according to a predetermined priority. Here, the service device 100 may set a priority of location information by checking a time zone. For example, when a PC at home and a PC at an office execute the same message service, the service device 100 determines location information with respect to the PC at home preferentially at night and determines location information with respect to the PC at the office preferentially during the day according to the predetermined priority. That is, in order to acquire current location information of a user terminal, the service device 100 analyzes a schedule of the personal schedule information and a current time zone, extracts current location information based on the analysis, and then determines the state information.

In this way, the terminal determines presence information according to the state information in which the location information and the personal schedule information of the user who executes the message service are combined and transmits the determined information to another terminal. Therefore, it is possible to check a current state of the partner in real time and to conveniently use the message service.

In this case, the first terminal 200 transmits and receives data related to the message service with the service device 100 via the communication network 400. In particular, the first terminal 200 executes the message service and requests access with another terminal from the service device 100. Then, the first terminal 200 collects the location information and the personal schedule information, transmits the collected information to the service device 100, and executes the message service with another terminal under control of the service device 100.

Then, the second terminal 300 outputs the presence information of the first terminal 200 received from the service device 100.

Next, configurations and operations of the service device 100 and the first terminal 200 in the message service system according to the embodiment of the invention will be described in detail.

Figure 2:
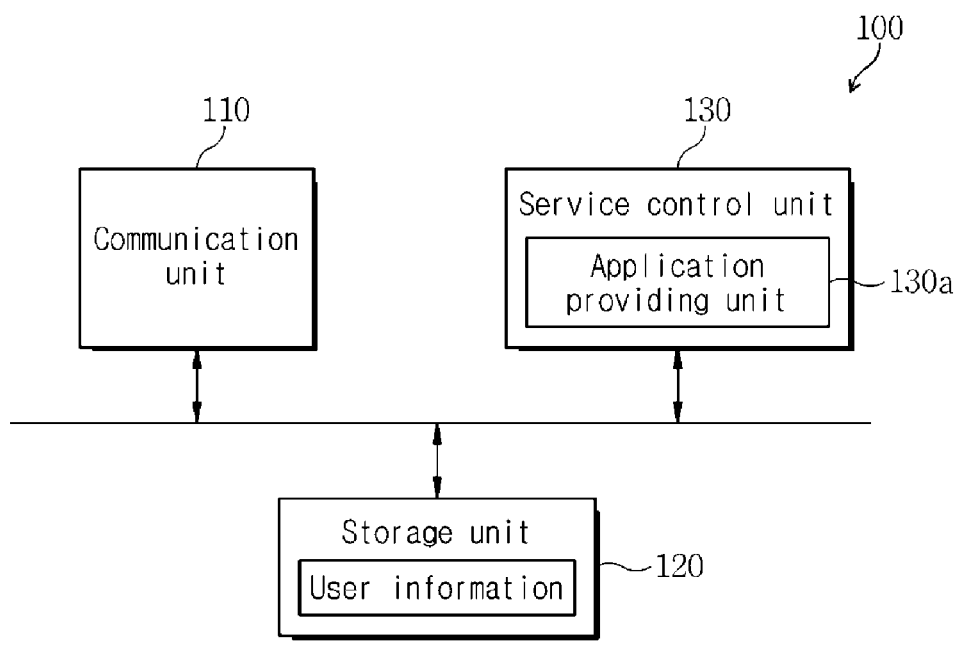
FIG. 2 is a block diagram illustrating a configuration of a service device according to an embodiment of the invention.

FIG. 2 is a block diagram illustrating a configuration of the service device 100 for user privacy protection in a multi-device environment according to the embodiment of the invention.

As illustrated in FIG. 2, the service device 100 according to the embodiment of the invention may include a communication unit 110, a storage unit 120, and a service control unit 130.

According to the first embodiment of the invention, the message service device 100 having the above-described configuration supports the message service to be used in any of the plurality of first terminals 200 registered by the user, and performs control such that only the user himself or herself checks a message of the specific first terminal 201 and the message is not disclosed to a user other than the user according to a service restriction request of the specific first terminal 201.

To this end, the communication unit 110 transmits and receives data for the message service between the plurality of first terminals 200 and the second terminal 300 via a communication network 300. More specifically, the communication unit 110 transmits the message that has been transmitted to the user from the second terminal 300 to the plurality of first terminals 200 at the same time, and transmits the user message that has been transmitted from any terminal out of the plurality of first terminals 200 to the second terminal 300.

The storage unit 120 stores data necessary for operating the service device 100. According to the embodiment of the invention, the storage unit 120 stores various pieces of information on a plurality of users provided with the message service, and more specifically, stores information (including identification information and access information such as an IP address) on the plurality of first terminals 200 registered by the user in order to receive a multi-device service. The information on the plurality of first terminals 200 may be mapped to user identification information and managed. In addition, the storage unit 120 may store restrictions on a service for each of the plurality of first terminals 200 registered by the user.

In addition, the service control unit 130 performs overall service control for providing a multi-device based message service. In particular, according to the embodiment of the invention, the service control unit 130 performs a registration process on the plurality of first terminals 200 used by the user according to the user's request. In this case, the service control unit 130 receives identification information and access information of the plurality of first terminals 200 from any terminal out of the plurality of first terminals 200 or through a web site, and registers the information together.

The service control unit 130 supports the message service to be used in any of the plurality of first terminals 200 registered by the user. Specifically, when the second terminal 300 transmits a message to the user, the service control unit 130 transmits the message to the plurality of first terminals 200 at the same time. In addition, when a message is transmitted to a partner from any terminal out of the plurality of first terminals 200, the service control unit 130 transmits the message to the second terminal 300.

In this state, when a service restriction request is generated for the specific first terminal 201 out of the plurality of first terminals 200, the service control unit 130 performs control such that only the user himself or herself checks a message of the specific first terminal 201 and the message is not disclosed to a user other than the user.

Here, the service restriction request of the specific first terminal 201 is generated when the service control unit 130 receives the request from any first terminal 202 out of the plurality of first terminals 200. Otherwise, the service control unit 130 checks a message service usage state (for example, whether a message is transmitted) of the plurality of first terminals 200, extracts a terminal that does not use the message service for a predetermined time (for example, an hour) as the specific first terminal 201, and thus the service restriction request may be generated. The specific first terminal 201 of which the service restriction is requested is set as a service restriction state in the storage unit 120.

In addition, message disclosure control of the specific first terminal 201 may be performed according to various methods.

For example, the service control unit 130 blocks message transmission to the specific first terminal 201. Then, when the service restriction request of the specific first terminal 201 is released, the service control unit 130 transmits the message that has been blocked and not transmitted to the specific first terminal 201. That is, the message is not provided to the specific first terminal 201 while the service restriction is requested. After the service restriction request is released, messages that have not been transmitted may be transmitted at once or separately.

In order to control message disclosure through the specific first terminal 201, the service control unit 130 encrypts a message and transmits the message to the specific first terminal 201. The message may be decoded and displayed only when the user is authenticated in the specific first terminal 201.

According to another embodiment of the invention, in order to control message disclosure through the specific first terminal 201, the service control unit 130 may transmit the message to the specific first terminal 201 along with a hiding or display restriction request of the message. In this case, the specific first terminal 201, which has received the message, may hide the corresponding message itself or a reception state thereof, or may display some of the message (for example, a sender, a receiver, or some of the message content) or the entire message in an unrecognizable form (for example, a mosaic type). The hidden message may be displayed or a part that is displayed in an unrecognizable form may be normally displayed only when the user is successfully authenticated.

Meanwhile, according to the second embodiment of the invention, the storage unit 120 may store the location information, the personal schedule information, the state information, the presence information, or the like received according to a message service execution request of the first terminal 200.

When at least one terminal executes the message service out of the plurality of first terminals 200, the service control unit 130 collects location information on an area in which the terminal that executes the message service is located and personal schedule information of the user. Here, the location information may include GPS information and access IP information of the terminal in which the message service is executed. In this case, the service control unit 130 obtains and stores the personal schedule information of the first terminal 200 that executes the message service.

The service control unit 130 checks the location information and the personal schedule information received from the first terminal 200 and determines state information based on the checked location information and personal schedule information. In this case, the service control unit 130 checks the personal schedule information in which the schedule of the user who executes the message service is classified by day of the week, date, and hour, matches the personal schedule information and the location information, and thus determines the state information. For example, the state information may indicate the user's state as being out when the terminal that executes the message service is a mobile terminal, off duty when the terminal is a personal computer, a laptop, or a smart broadcast terminal installed at home, or on duty when the terminal is a personal computer terminal or a laptop installed in the office.

The service control unit 130 provides presence information corresponding to the determined state information to another second terminal 300. That is, the service control unit 130 transmits the presence information, such as an avatar, an emoticon, or a flashcon, indicating the state information to another terminal. In this case, the service control unit 130 may transmit at least one piece of presence information to the second terminal 300 or transmit two or more pieces of presence information to the second terminal 300 at the same time.

In particular, the service control unit 130 determines a priority of collected information based on a property including at least one of a time zone during which the location information or the personal schedule information is collected and a type of the terminal, and may determine current state information of the user based on information having a high priority.

In order to more effectively perform operations of the service device 100, the service control unit 130 may further include an application providing unit 130*a*. The application providing unit 130*a* provides data for executing the message service according to the first terminal 200. In addition, the application providing unit 130*a* matches the location information and the personal schedule information received from the terminal 200 and determines state information corresponding to the current location. The application providing unit 130*a* selects presence information corresponding to the state information and provides the selected information to another second terminal 300 that executes the same message service.

Further, the service control unit 130 according to the second embodiment of the invention checks the location information of the first terminal 200 and login or logout information of the message service using the first terminal 200, analyzes the personal schedule information on the schedule of the user by hour, date, day of the week, month, and year, and determines the state information. In this case, when a plurality of terminals having different location information access the message service at the same time, the service control unit 130 determines the state information by combining current location information of the terminal and corresponding personal schedule information according to a predetermined priority. Here, the service control unit 130 may set a priority of location information by checking a time zone. For example, when a PC at home and a PC at the office execute the same message service, the service device 100 determines location information with respect to the PC at home preferentially at night and determines location information with respect to the PC at the office preferentially during the day according to the predetermined priority. That is, in order to acquire current location information of a user terminal, the service device 100 analyzes a schedule of the personal schedule information and a current time zone, extracts current location information based on the analysis, and then determines the state information.

In addition, the service device 100 having the above configuration may be implemented by a server-based computing method or may be implemented as at least one server that is operated according to a cloud method. In particular, data generated by executing the message service using a cloud computing device may be provided through a cloud computing function of permanently storing data in a cloud computing device over the Internet. Here, cloud computing refers to technology for providing virtualized information technology (IT) resources such as hardware (for example, a server, a storage, or a network), software (for example, a database, security, or a web server), services, or data on demand utilizing Internet technology in a digital terminal such as a desktop, a tablet computer, a laptop, a netbook or a smart phone.

Figure 3:
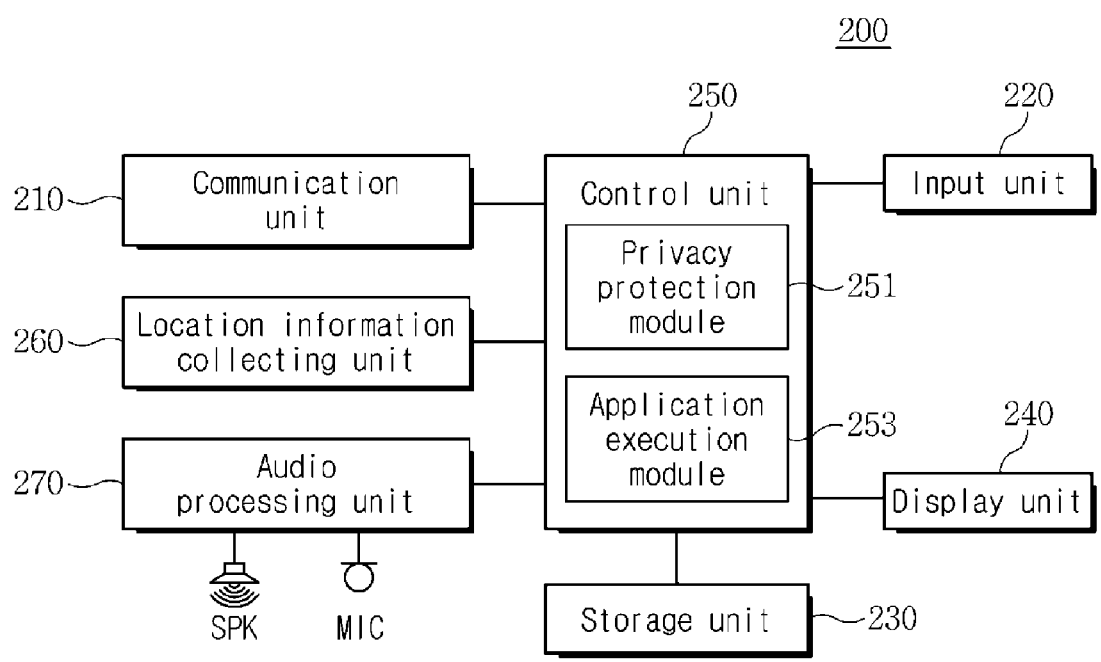
FIG. 3 is a block diagram illustrating a configuration of a terminal in a multi-device environment according to an embodiment of the invention.

Next, FIG. 3 is a block diagram illustrating a configuration of the first terminal in a multi-device environment according to the embodiment of the invention.

As illustrated in FIG. 3, the first terminal 200 according to the invention may include a communication unit 210, an input unit 220, a storage unit 230, a display unit 240, and a control unit 250. In addition, the first terminal 200 may further include a location information collecting unit 260 and an audio processing unit 270.

First, the communication unit 210 transmits and receives data via the communication network 300.

According to the first and second embodiments of the invention, the communication unit 210 transmits and receives data related to the message service, and more specifically, data related to the multi-device based message service. To this end, in order to form a communication channel with the communication network 300, the communication unit 210 may include a communication module according to at least one communication method out of various communication methods. For example, the communication unit 210 may include at least one communication module that supports at least one of various mobile communication methods such as 1G, 2G, and 3G methods, a wired communication method, or a wireless communication method such as Wi-Fi.

The communication unit 210 transmits a message transmitted from the second terminal 300 to the plurality of first terminals 200 registered by the user, or transmits a message transmitted from any of the plurality of first terminals 200 to the second terminal 300.

The input unit 220 generates a user input signal corresponding to a user request, receives numbers or various pieces of text information, and may include input keys and function keys for setting various functions and for function control of the first terminal 200. Such an input unit 220 may include various types of input devices such as a keyboard, a keypad, a mouse, and a motion sensor. When the first terminal 200 includes a touch screen, the input unit may include a soft key and a side key implemented in the touch screen, a separate hot key, a shortcut key, or the like. According to the invention, the input unit 220 may be used to write a message, transmit the written message, check a received message, request a service restriction, and request user authentication for checking the message.

The storage unit 230 stores a program and data necessary for operating the first terminal 200, and data generated as an operation result, and may include a program section and a data section. Such storage unit 230 may store an operating system (OS) of the first terminal 200 and various applications, for example, an application related to the message service and a program having a user protection function.

In particular, the storage unit 230 according to the second embodiment of the invention stores data generated by executing the message service, that is, the location information, the personal schedule information, the state information, and the presence information. For example, the location information includes Global Positioning System (GPS) information and access IP information of the first terminal 20 in which the message service is executed. The personal schedule information includes information on the schedule of the user classified by day of the week, date, and hour. The state information includes information indicating the user's state as being out when the terminal that executes the message service is a mobile terminal, off duty when the terminal is a personal computer, a laptop, or a smart broadcast terminal installed at home, or on duty when the terminal is a personal computer terminal or a laptop installed in the office. The presence information includes an avatar, an emoticon, a flashcon or the like that indicates the state information.

The display unit 240 displays an operation state and an operation result of the first terminal 200 or provides predetermined information to the user, and displays various menus, information input by the user, or information to be provided to the user. That is, the display unit 240 may provide various screens according to the usage of the first terminal 200, for example, a waiting screen, a menu screen, and a message transmission and reception screen. In particular, according to the first embodiment of the invention, the display unit 240 may output a user interface screen for processing a service restriction request and a hidden or display restricted message. In addition, according to the second embodiment of the invention, the display unit 240 displays an execution screen of the message service and presence information related to state information of a partner terminal that uses the same message service. Here, the presence information includes an avatar, an emoticon, a flashcon, or the like.

Such a display unit 240 may be formed in the form of a flat display panel type such as a liquid crystal display or an organic light emitting diode (OLED). The display unit 240 may be formed as a structure having a display panel and a touch panel depending on a manufacturing form.

The control unit 250 controls overall operations of the first terminal 200. More specifically, the control unit 250 executes an OS program stored in the storage unit 230, builds an execution environment in which various applications can be operated, and performs a specific application or a function according to the user's request or a set algorithm based on the environment.

In particular, according to the first embodiment of the invention, the control unit 250 transmits and receives a message of the user through the communication unit 210 and outputs the message in a form recognizable to the user through the display unit 240. When a user input signal generated through the input unit 210 is checked and a service restriction request of the user is generated, the control unit 250 transmits the request to the service device 100. In this case, the control unit 250 may transmit information (including at least one of identification information and access information) on the specific first terminal 201 of the plurality of first terminals 200 used by the user for which the service will be restricted.

On the other hand, when the first terminal 200 is set as a service restriction target, the control unit 250 may perform disclosure control on a message related to the user under control of the service device 100. More specifically, even when the control unit 250 receives a message that has been transmitted to the user from the second terminal 400 through the service device 100, if the service restriction request is received together with the message, the control unit 250 performs control such that a transmission and reception state of the message is hidden so as not to be known and the hidden message is displayed through the display unit 240 when the user is successfully authenticated. That is, the message is received and stored, but is processed as, for example, a hidden file such that its reception and storage states are not known. Then, when the user is successfully authenticated, the hidden state is released and the message is displayed.

In addition, even when the control unit 250 receives and displays a message that has been transmitted to the user from the second terminal 300 through the service device 100, if the service restriction request is received together with the message, the control unit 250 displays at least one of a sender and a receiver of the message and some of the message content in an unrecognizable state (for example, through a mosaic process). When the user is successfully authenticated, at least one of the sender, the receiver, and some of the message content may be changed to a recognizable state and displayed. In this case, everyone may know a message reception state but only the user may check detailed content of the message.

In addition, the control unit 250 may receive an encrypted message from the service device 100. In this case, only the reception state of the message is notified of (displayed). When the user is successfully authenticated, the content of the message is decoded and displayed. Therefore, no user other than the user himself or herself may check the message content.

To this end, the control unit 250 may further include a privacy protection module 251 for performing the above-described process.

Meanwhile, according to the second embodiment of the invention, the control unit 250 executes the message service, links with the service device 100, and outputs the presence information corresponding to the state information of the second terminal 300. That is, the control unit 250 executes the message service and requests access with the second terminal 300 from the service device 100. In addition, the control unit 250 collects current terminal location information and personal schedule information of the user and transmits the collected information to the service device 100. Here, the location information may include GPS information and access IP information of the terminal in which the message service is executed. The personal schedule information may include information on the schedule of the user classified by day of the week, date, and hour. Then, the control unit 250 may perform the message service with the second terminal 300 under control of the service device 100.

In order to more effectively perform operations of the first terminal 200, the control unit 250 may further include an application execution module 253. The application execution module 253 downloads the message service from the service device 100 according to the user's request and stores the message service in the storage unit 230. In addition, the application execution module 253 may control and manage overall operations for executing the message service.

To this end, under control of the control unit 250, the location information collecting unit 260 receives a GPS signal from at least one GPS satellite, identifies current location information such as a latitude and a longitude of the first terminal 200, and transmits the information to the control unit 250. However, when only the signal received from the GPS satellite is used, an error may occur. Therefore, in order to obtain accurate location information, the location information collecting unit 260 may use pilot phase file information and round trip delay information transmitted from a base station in addition to the GPS signal. Here, the base station has two functions. One is a function of mediating data transmission between the first terminal 200 and a communication center. The other is a function of transmitting the location of the first terminal 200, that is, data for identifying the user's location. Therefore, the location information collecting unit 260 receives the above-described location information, identifies the location of the corresponding first terminal 200, or may identify current location information of the terminal using, for example, triangulation in which location information is received from three or more base stations and a precise location is identified.

In addition, the location information collecting unit 260 may collect location information through an IP address in which the message service is executed over the network. Here, the location information collecting unit 260 analyzes the IP address and checks local information of a location related to the analyzed IP address.

Additionally, the audio processing unit 270 performs a function of a speaker SPK that reproduces and outputs an audio signal or a function of delivering an audio signal input from a microphone MIC to the control unit 250. The audio processing unit 270 may convert an analog audio signal input through the microphone into a digital signal and deliver the converted signal to the control unit 250. In addition, the audio processing unit 270 may convert a digital audio signal output from the control unit 250 into an analog signal and output the converted signal through the speaker. In particular, the audio processing unit 270 outputs an entire effect sound, setting sound, or execution sound according to function execution of the first terminal 200 and execution of the message service.

Hereinafter, a service providing process for user privacy protection that is performed between the service device 100 and the first and second terminals 200 and 300 in the multi-device environment according to the first embodiment of the invention will be described.

Figure 4:
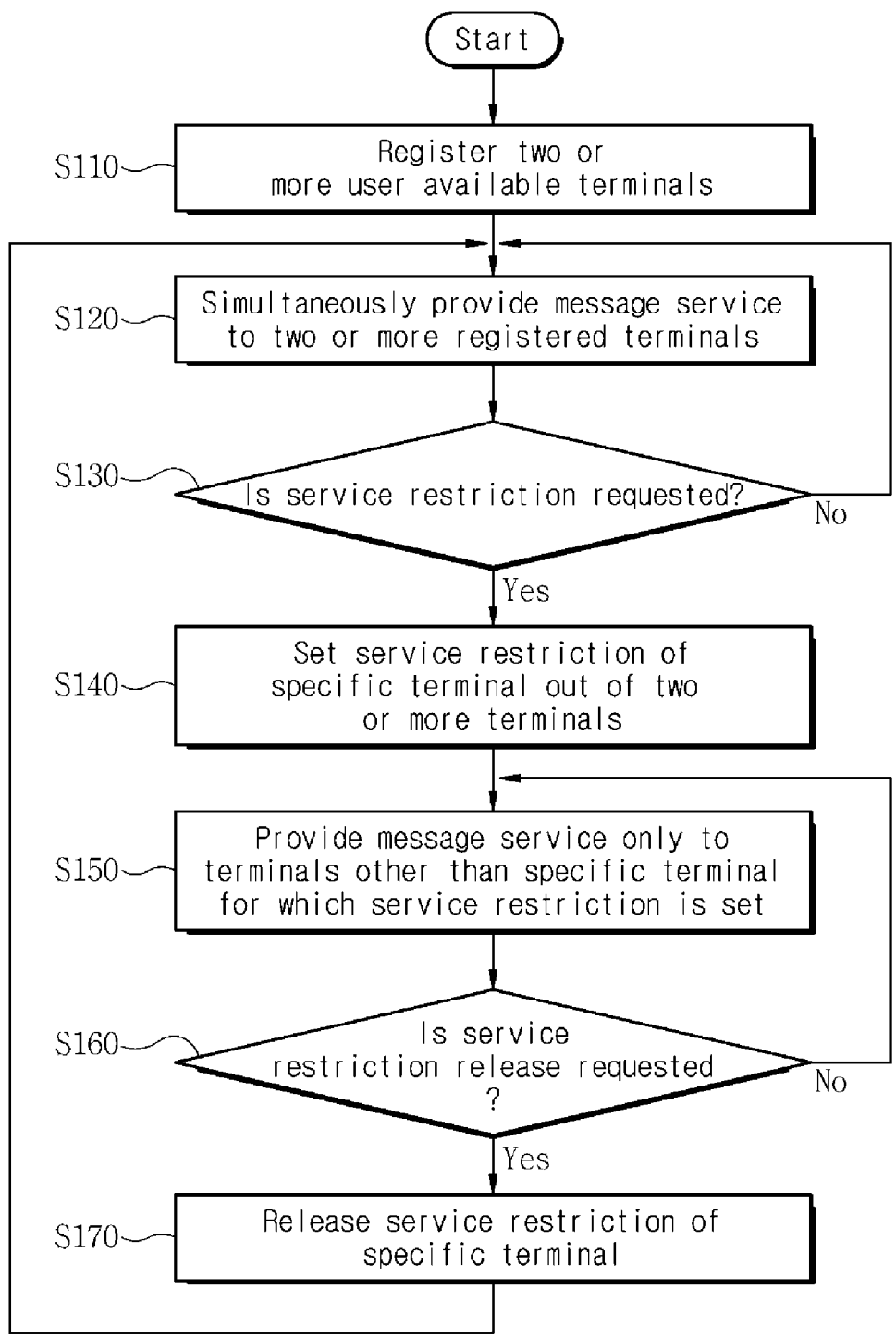
FIG. 4 is a flowchart illustrating operations of a service device that show a service providing method for user privacy protection in a multi-device environment according to a first embodiment of the invention.

FIG. 4 is a flowchart illustrating a service providing method for user privacy protection that is performed by the service device 100 in the multi-device environment according to the first embodiment of the invention.

As illustrated in FIG. 4, the service device 100 receives and registers information (including identification information and access information) on the plurality of first terminals 200 to be used by the user who uses the message service (S110).

Subsequently, the multi-device based message service is provided to the user through the plurality of registered first terminals 200 (S120). More specifically, the message received from the second terminal 300 is simultaneously transmitted to the plurality of first terminals 200. When a message is transmitted from any of the plurality of first terminals 200, the message is transmitted to the second terminal 300.

As described above, while transmission and reception messages of the user are provided to the plurality of first terminals 200, the service device 100 checks whether the service restriction request of the specific first terminal 201 is generated out of the plurality of first terminals 200 (S130). Here, the service restriction request may be received from any of the plurality of first terminals 200, or may be automatically generated for the specific first terminal 201 that does not use the message service for a predetermined time or more by checking a message service usage state through the plurality of first terminals 200, and more specifically, by checking a message transmission state.

Then, the service device 100 sets the specific first terminal 201 for which service restriction is requested in a service restriction state and registers the state in the storage unit 230 (S140), and then controls message transmission to the specific first terminal 201 such that the message is not disclosed through the specific first terminal 201 (S150).

An operation of S150 may be performed according to various methods. According to the embodiment of the invention, the service device 100 may block message transmission to the specific first terminal 201. That is, the message related to the user is not provided to the specific first terminal 201 and thus it is possible to prevent the message from being disclosed to another user.

According to another embodiment of the invention, in order to control message disclosure through the specific first terminal 201, the service device 100 may encrypt a message and transmit the message to the specific first terminal 201. That is, the message is encrypted and transmitted such that only an authenticated user may check the message content.

According to still another embodiment of the invention, in order to control message disclosure through the specific first terminal 201, the service device 100 may transmit the message to the specific first terminal 201 along with a hiding or display restriction request of the message. That is, although the message is transmitted, the service restriction request such as a hiding or display restriction of the message is also transmitted. Therefore, user information may be protected in the specific first terminal 201.

While control of user privacy disclosure through the specific first terminal 201 is performed according to the above various methods, the service device 100 checks a request for releasing the service restriction on the specific first terminal 201 (S160). When the request for releasing the service restriction is generated, the service device 100 releases service restriction setting on the specific first terminal 201 and then allows the message to be provided as in other first terminals (S170). In particular, according to the embodiment of the invention, after the service restriction setting is released, the service device 100 may transmit the message that is previously blocked and not transmitted to the specific first terminal 201 and allow the message to be checked by the user.

Figure 5:
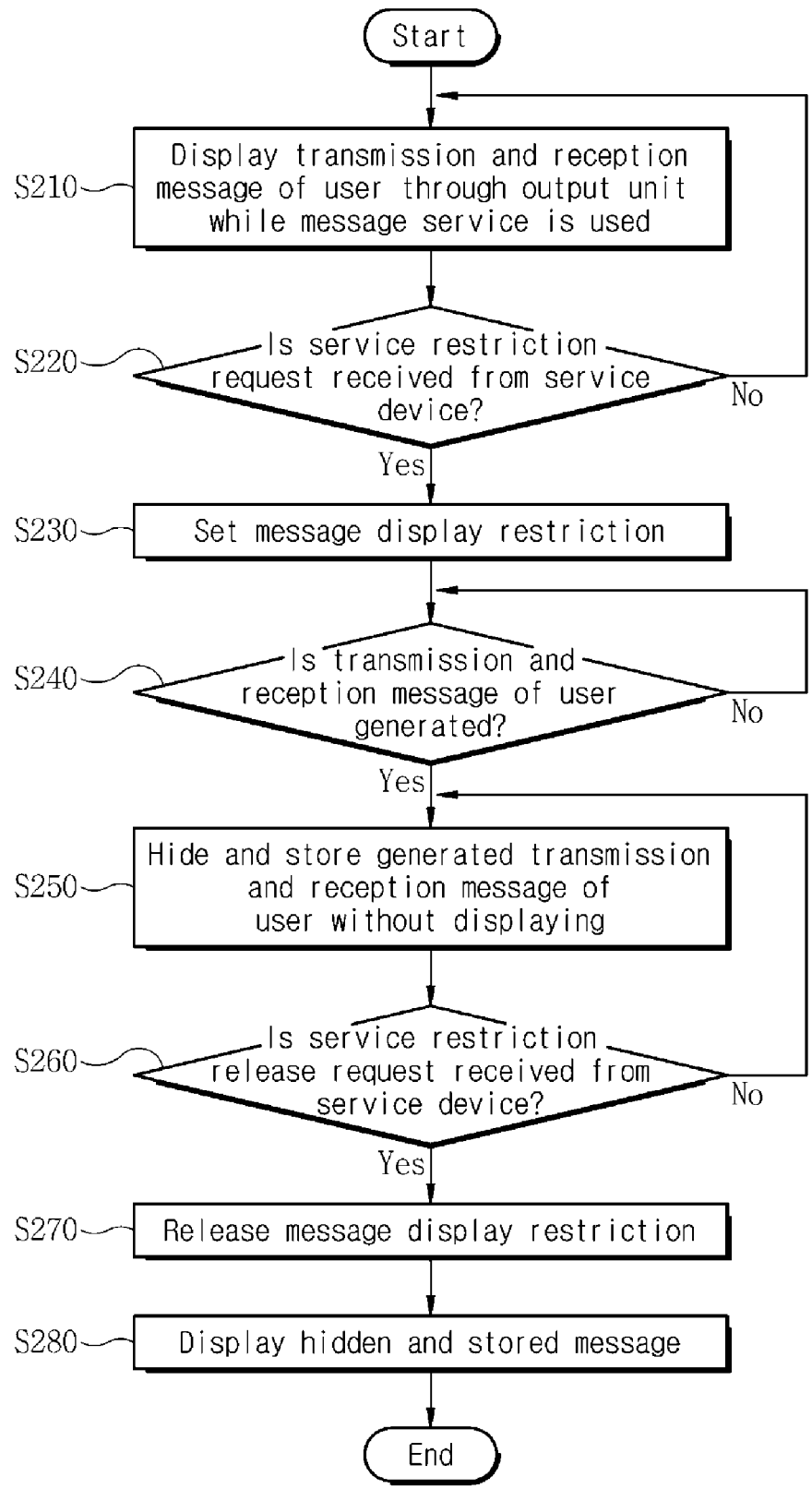
FIG. 5 is a flowchart of a terminal showing a service providing method for user privacy protection in the multi-device environment according to the first embodiment of the invention.

FIG. 5 is a flowchart illustrating a service providing method for user privacy protection that is performed by the first terminal 200 in the multi-device environment according to the first embodiment of the invention.

As illustrated in FIG. 5, in general, each of the plurality of first terminals 200 registered by the user receives transmission and reception messages related to the user through the service device 100 and outputs the messages in a form recognizable to the user through a first display unit 240 (S210).

While the above operation is performed, when a user input signal generated through the input unit 220 is checked and a service restriction request of the user is generated, the request may be transmitted to the service device 100.

In addition, the first terminal 200 is set as a service restriction target under control of the service device 100 that has received the service restriction request of the first terminal 200 and the service restriction request may be received from the service device 100 (S220). When the message related to the user is transmitted and received, the service restriction request may be received together with each message. Otherwise, the service restriction request may be separately received before the message is received.

In this way, when the service restriction request is received, the first terminal 200 sets a message display restriction (S230). Then, when the transmission and reception message related to the user is generated (S240), the generated message is hidden and stored (S250). Here, hiding and storing mean that the message is managed as a hidden file such that the user does not know the message content or that the message is received. According to another embodiment of the invention, the message itself is not hidden but only some of the message (for example, a sender, a receiver, and some of the message content) may be converted into an unrecognizable form (for example, a mosaic type) and displayed. In addition, according to still another embodiment of the invention, an encrypted message is received and the message may be displayed in an encrypted state without change. Only when the user is successfully authenticated (S260), the message that is hidden, converted into an unrecognizable form, or encrypted is released from a hidden state, is converted into a recognizable form, or is decoded (S270), and then may be output normally through the display unit 240 (S280).

Figure 6:
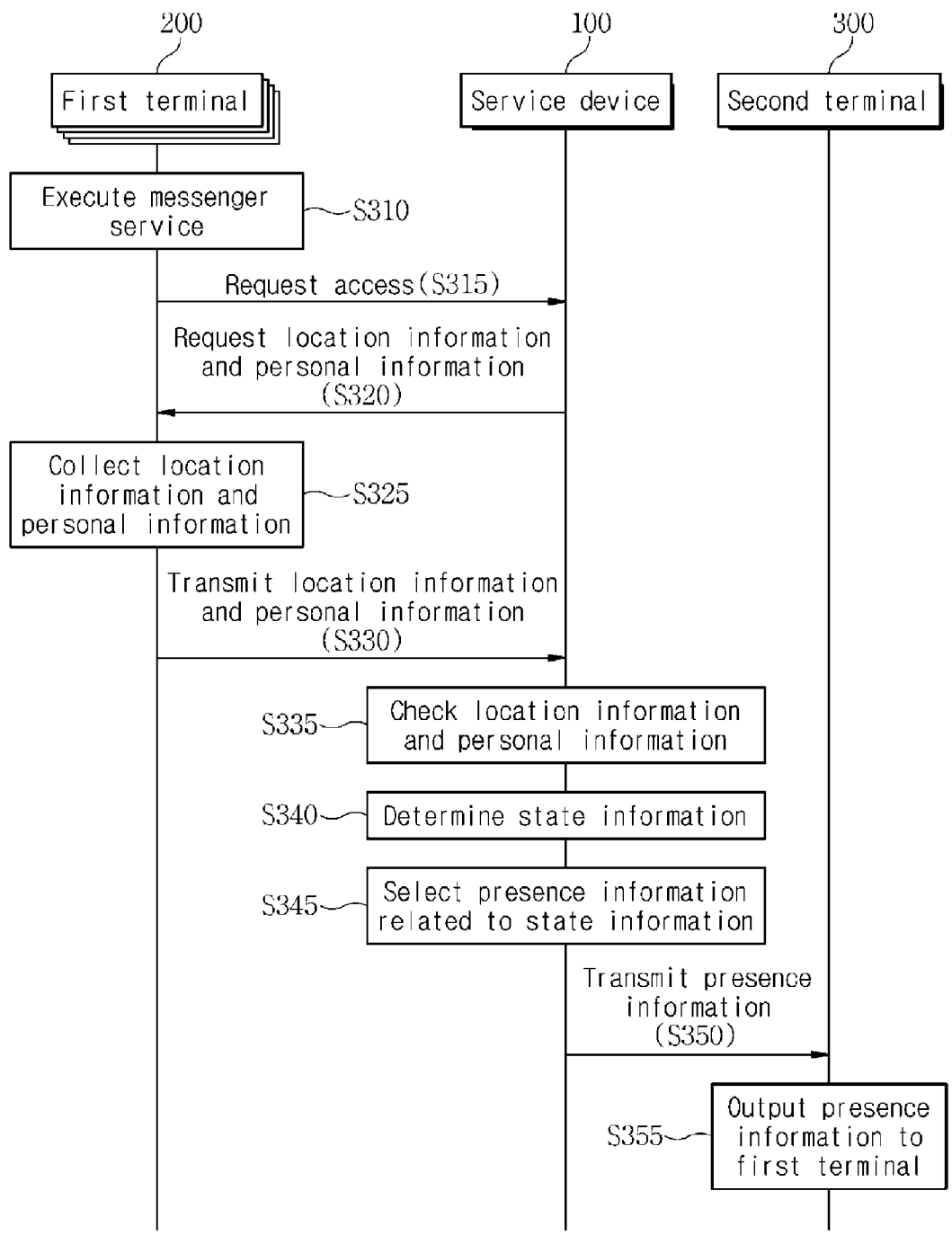
FIG. 6 is a diagram illustrating a data flow in a location-based service providing method in a multi-device environment according to a second embodiment of the invention.

FIG. 6 is a diagram illustrating a data flow in a location-based service providing method in the multi-device environment according to the second embodiment of the invention.

In the location-based service providing method in the multi-device environment according to the second embodiment of the invention, the plurality of first terminals 200 are used by the same user and execute the message service. The second terminal 300 may transmit and receive a message with the first terminal 200 through the message service, receive presence information of the first terminal 200 from the service device 100, and provide the received information to the user.

In S310, the first terminal 200 drives an internally stored application and executes the message service. In S315, the first terminal 200 requests access with the second terminal 300 in order to execute the message service. Then, in S320, the service device 100 requests location information on a current location of the terminal and personal schedule information of the user. Here, the location information may include GPS information and access IP information of the first terminal 200 in which the message service is executed and the personal schedule information may include information on the schedule of the user classified by day of the week, date, and hour.

In S325, the first terminal 200 collects the location information and the personal schedule information. Then, in S330, the first terminal 200 transmits the collected location information and personal schedule information to the service device 100.

In S335, the service device 100 checks the location information and personal schedule information received from the first terminal 200. Then, in S340, the service device 100 determines state information based on the checked location information and personal schedule information. In this case, the service device 100 checks the personal schedule information in which the schedule of the user who executes the message service is classified by day of the week, date, and hour, matches the personal schedule information and the location information, and thus determines the state information. For example, the state information indicates the user's state as being out when the terminal that executes the message service is a mobile terminal, off duty when the terminal is a personal computer, a laptop, or a smart broadcast terminal installed at home, or on duty when the terminal is a personal computer terminal or a laptop installed in the office.

In S345, the service device 100 selects presence information corresponding to the state information. For example, the service device 100 selects the presence information, such as an avatar, an emoticon, or a flashcon, indicating the state information according to predetermined data. In this case, the service device 100 may select at least one piece of presence information or two or more pieces of presence information at the same time. In S350, the service device 100 transmits the presence information to the second terminal 300.

In S355, the second terminal 300 outputs the presence information received from the service device 100 on the message service.

In this way, the terminal determines presence information according to the state information in which the location information and the personal schedule information of the user who executes the message service are combined and transmits the determined information to another terminal. Therefore, it is possible to check a current state of the partner in real time and to conveniently use the message service.

Figure 7:
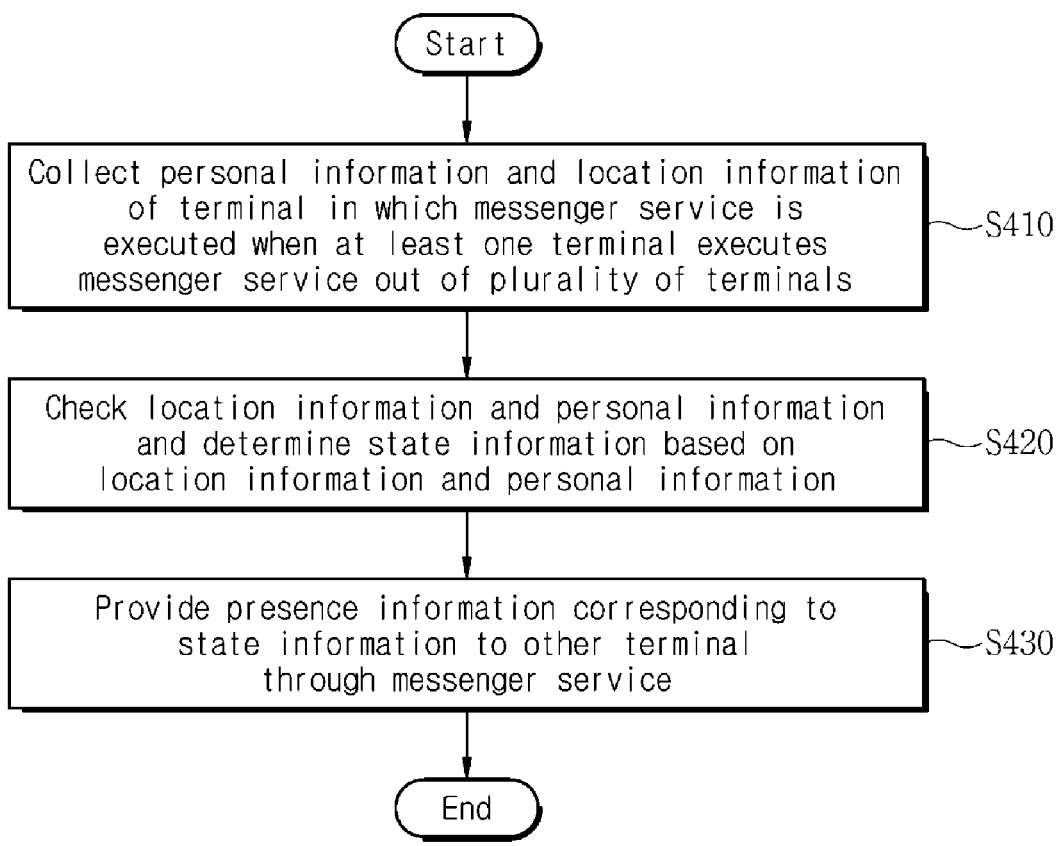
FIG. 7 is a flowchart illustrating operations of a service device according to the second embodiment of the invention.

FIG. 7 is a flowchart illustrating operations of the service device 100 according to the second embodiment of the invention. FIGS. 8 to 9 are diagrams illustrating exemplary screens according to the embodiment of the invention.

As illustrated in FIG. 7, in S410, when at least one terminal out of the plurality of first terminals 100 executes the message service, the service device 10 according to the second embodiment of the invention collects location information on an area in which the message service is executed and personal schedule information. Here, the location information may include GPS information and access IP information of the terminal in which the message service is executed. In this case, the service device 100 obtains and stores the personal schedule information of the first terminal 200 in which the message service is executed.

In S420, the service device 100 checks the location information and personal schedule information received from the first terminal 200 and determines state information based on the checked location information and personal schedule information. In this case, the service device 100 checks the personal schedule information in which the schedule of the user who executes the message service is classified by day of the week, date, and hour, matches the personal schedule information and the location information, and thus determines the state information. For example, the state information indicates the user's state as being out when the terminal that executes the message service is a mobile terminal, off duty when the terminal is a personal computer, a laptop, or a smart broadcast terminal installed at home, or on duty when the terminal is a personal computer terminal or a laptop installed in the office.

In S430, the service device 100 provides the presence information corresponding to the state information to another terminal. That is, the service device 100 transmits the presence information, such as an avatar, an emoticon, or a flashcon, indicating the state information to the second terminal 300. In this case, the service device 100 may transmit at least one piece of presence information to the second terminal 300 or transmit two or more pieces of presence information to the second terminal 300 at the same time.

For example, as illustrated in FIGS. 8 to 9, when a plurality of users A, B, C, and D execute the message service, the service device 100 determines state information based on location information and personal schedule information of each of the users and provides the presence information to be output on a screen of a partner terminal according to the state information. As described above, while the specification and drawings describe exemplary embodiments of the invention and specific terms are used in the specification and drawings, these are used with general meanings to easily describe technological content of the invention and to help understanding of the invention, and the invention is not limited thereto. It is apparent to those skilled in the art that various modifications based on the technological scope of the invention in addition to the embodiments disclosed herein can be made.

INDUSTRIAL APPLICABILITY

According to the present invention, the user who uses the message service including a short message service, a multimedia message service, an instant message service, or the like registers a plurality of terminals including, for example, at least one of a desktop PC, a laptop, a tablet PC, and a mobile communication terminal, as multiple device, and is allowed to use the message service at the same time. When a specific terminal of the plurality of terminals is lost or is left in an environment in which another user can use the terminal, disclosure of a message through the specific terminal is restricted. Accordingly, it is possible to prevent user privacy information from being disclosed through the specific terminal.

The invention claimed is:

1. A message service system in a multi-device environment, comprising:
    a plurality of terminals of a user configured to use a message service; and
    a service device comprising
        a communicator configured to transmit and receive data with the plurality of terminals via a communication network,
        a memory configured to store registration information of the plurality of terminals, and
        a service controller configured to
            register the plurality of terminals to the message service for the user,
            provide the message service through the registered plurality of terminals, and
            restrict, according to a service restriction request of a specific terminal out of the registered plurality of terminals, the message service of the specific terminal such that a message is disclosed to only a user who is authenticated in the specific terminal,
        wherein, when a terminal among the registered plurality of terminals does not perform the message service for a predetermined time, the service controller is configured to generate a service restriction request of the terminal.

2. The system according to claim 1, wherein the service device is configured to
    collect location information and personal schedule information of the user from at least one terminal of the registered plurality of terminals,
    analyze at least one of the collected location information and personal schedule information, and
    determine, based on the analyzed information, state information of the user as presence information of the user.

3. A service device for a message service in a multi-device environment, comprising:
    a communicator configured to transmit and receive data with terminals via a communication network;
    a memory configured to store registration information of a plurality of terminals of a user; and
    a service controller configured to
        register the plurality of terminals to the message service for the user,
        provide the message service through the registered plurality of terminals, and
        restrict, according to a service restriction request of a specific terminal out of the registered plurality of terminals, the message service of the specific terminal such that a message is disclosed to only a user who is authenticated in the specific terminal,
    wherein, when a terminal among the registered plurality of terminals does not perform the message service for a predetermined time, the service controller is configured to generate a service restriction request of the terminal.

4. The device according to claim 3, wherein the service controller is configured to receive the service restriction request of the specific terminal from any terminal of the registered plurality of terminals.

5. The device according to claim 3, wherein the service controller is configured to encrypt a message and transmits the encrypted message to the specific terminal such that the encrypted message is decrypted and disclosed to only an authenticated user after the user is authenticated in the specific terminal.

6. The device according to claim 3, wherein, when the message is transmitted to the specific terminal according to the service restriction request of the specific terminal, the service controller is configured to transmit a hiding or display restriction request of the message with the message such that the message is disclosed in the specific terminal after the user is authenticated.

7. The device according to claim 3, wherein the service controller is configured to
collect location information and personal schedule information of the user from at least one terminal of the registered plurality of terminals,
analyze at least one of the collected location information and personal schedule information, and
determine, based on the analyzed information, state information of the user as presence information of the user.

8. The device according to claim 7, wherein the service controller is configured to determine
a priority of the collected information based on a property including at least one of
a time zone in which the location information or the personal schedule information is collected, and
a type of the terminal, and
the state information of the user based on information having a high priority.

9. A message service method performed by a service device in a multi-device environment, comprising:
providing transmission and reception messages of a user to a plurality of terminals registered by the user;
checking a service restriction request of a specific terminal out of the plurality of terminals;
controlling transmission message to the specific terminal such that a message is disclosed to only a user who is authenticated in the specific terminal; and
when a terminal among the registered plurality of terminals does not perform the message service for a predetermined time, generating a service restriction request of the terminal.

10. The method according to claim 9, wherein, in the controlling, the service device encrypts a message and transmits the encrypted message to the specific terminal, and the encrypted message is decoded after the user is authenticated in the specific terminal.

11. The method according to claim 9, wherein, in the controlling, the service device transmits, to the specific terminal, the message along with a hiding or display restriction request of the message, and the message is disclosed only after the specific terminal authenticates the user.

* * * * *